(12) United States Patent
Fusejima et al.

(10) Patent No.: US 8,856,498 B2
(45) Date of Patent: Oct. 7, 2014

(54) PREFETCH REQUEST CIRCUIT

(75) Inventors: Atsushi Fusejima, Kawasaki (JP); Norihito Gomyo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 624 days.

(21) Appl. No.: 13/220,006

(22) Filed: Aug. 29, 2011

(65) Prior Publication Data
US 2011/0314262 A1 Dec. 22, 2011

Related U.S. Application Data

(63) Continuation of application No. PCT/JP2009/001465, filed on Mar. 30, 2009.

(51) Int. Cl.
*G06F 12/08* (2006.01)
*G06F 9/30* (2006.01)
*G06F 9/34* (2006.01)

(52) U.S. Cl.
CPC ........ *G06F 12/0862* (2013.01); *G06F 9/30181* (2013.01); *G06F 9/34* (2013.01)
USPC ........................................................ 712/220

(58) Field of Classification Search
CPC combination set(s) only.
See application file for complete search history.

(56) References Cited

U.S. PATENT DOCUMENTS

| | | | | |
|---|---|---|---|---|
| 5,835,967 A | * | 11/1998 | McMahan | 711/213 |
| 6,560,676 B1 | * | 5/2003 | Nishimoto et al. | 711/128 |
| 6,981,100 B2 | * | 12/2005 | Ryan et al. | 711/137 |
| 2003/0014473 A1 | * | 1/2003 | Ohsawa et al. | 709/107 |
| 2003/0135684 A1 | * | 7/2003 | Saen et al. | 710/307 |
| 2004/0003179 A1 | | 1/2004 | Shirahige et al. | |
| 2005/0083758 A1 | * | 4/2005 | Ryan et al. | 365/222 |
| 2007/0214335 A1 | * | 9/2007 | Bellows et al. | 711/167 |
| 2008/0320229 A1 | | 12/2008 | Shirahige et al. | |

FOREIGN PATENT DOCUMENTS

| | | |
|---|---|---|
| EP | 1990731 | 11/2008 |
| EP | 2 159 699 A1 | 3/2010 |
| JP | 58-169384 | 10/1983 |
| JP | 59-218691 | 12/1984 |
| JP | 2004-38345 | 2/2004 |
| WO | 2007/099582 A1 | 9/2007 |
| WO | 2007/099598 A1 | 9/2007 |
| WO | WO 2008/155815 A1 | 12/2008 |

OTHER PUBLICATIONS

International Search Report for PCT/JP2009/001465, mailed Dec. 8, 2009.
Japanese Office Action issued in corresponding Japanese Patent Application No. 2011-508060 issued on Dec. 18, 2012.

* cited by examiner

*Primary Examiner* — Eric Coleman
(74) *Attorney, Agent, or Firm* — Staas & Halsey LLP

(57) ABSTRACT

A prefetch request circuit is provided in a processor device. The processor device has hierarchized storage areas and can prefetch data of address to be used between appropriate storage areas among the storage areas, when executing respective instruction flows obtained by multi-flow expansion for one instruction at a time of decoding of the instruction. The prefetch request circuit includes a latch unit to hold, when a state in which the respective instruction flows to access the storage area are executed with a maximum specifiable data transfer volume is specified, the state during a time period of the multi-flow expansion; and a prefetch request signal output unit to output a prefetch request signal to request the prefetch every time when the instruction flow is executed, based on an output signal of the latch unit and a signal indicating an execution timing of the respective instruction flows.

4 Claims, 10 Drawing Sheets

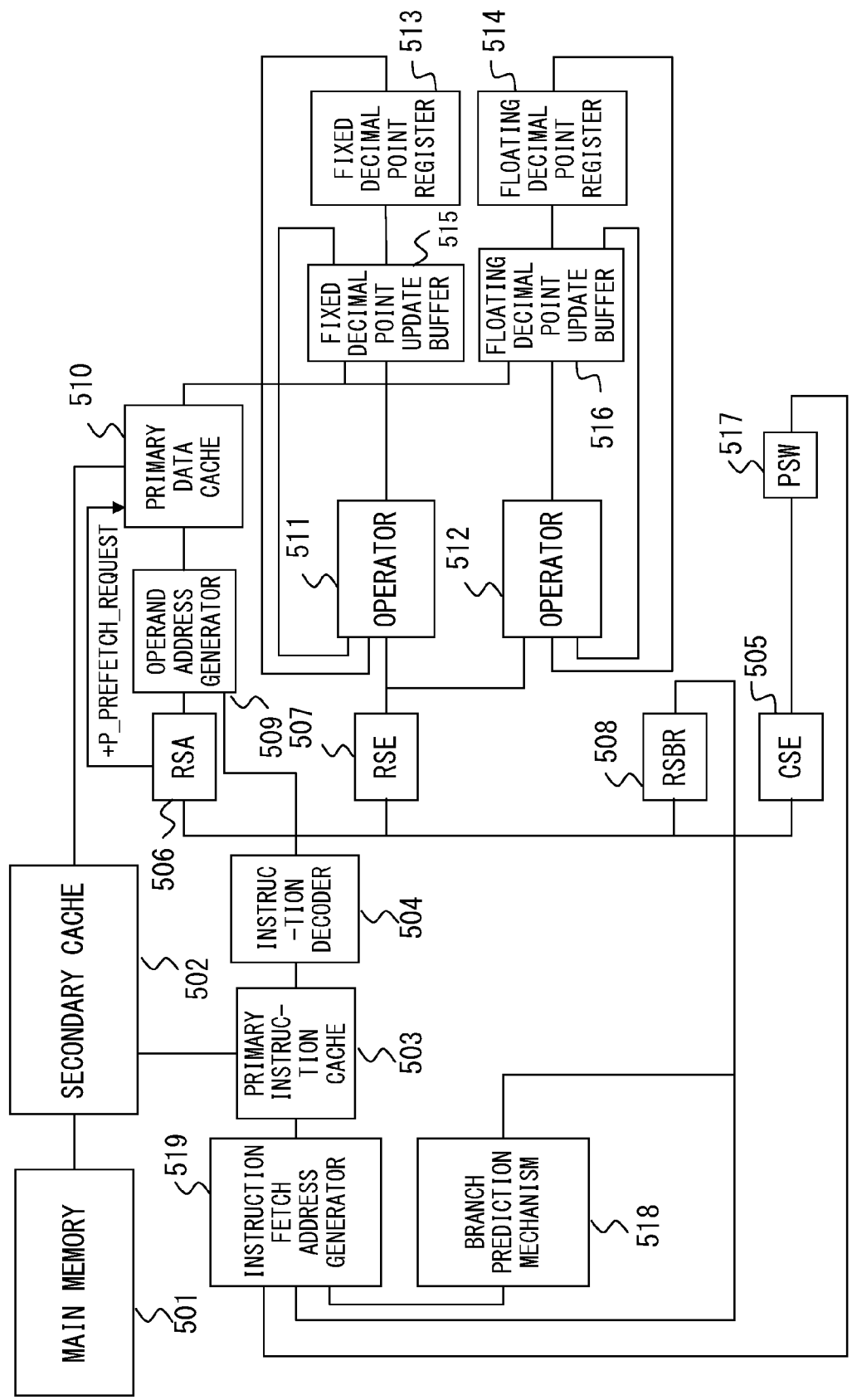
F I G. 5

PREFETCH REQUEST CIRCUIT

CROSS-REFERENCE TO RELATED APPLICATION

This application is a continuation of an international application PCT/JP2009/001465, which was filed on Mar. 30, 2009.

FIELD

The embodiments described in the application are related to a prefetch request circuit.

BACKGROUND

A processor device of a computer is, generally, equipped with a secondary cache and a primary data cache, a primary instruction cache and the like to enhance the access performance to a main memory.

In a processor, an instruction read out from the main memory via the secondary cache and the primary instruction cache is sent to an instruction decoder and decoded.

If the decoded instruction is an memory access instruction such as a load instruction, a store instruction and a memory copy instruction, an operand address generator calculates the memory address to be accessed, and an access to the primary data cache is performed with the calculated address.

Here, at the time of execution of an memory copy instruction, data of the copy source address (assumed as an "address A") on the memory is copied to the copy destination address (assumed as an "address B"). Since the instruction length is fixed, there is a maximum copy size that can be specified at a time by a memory copy instruction.

When a data size that is equal to or smaller than the data transfer capacity in one cycle between the main memory and the secondary cache or between the secondary cache and the primary data cache is specified in one instruction as the copy size, a process illustrated in FIG. 1A is performed for example. That is, the decoded memory copy instruction is sequentially registered in the order of decoding in an instruction queue called CSE (Commit Stack Entry). In the example in FIG. 1A, it is assumed that the memory copy instruction is registered in an entry CSE0 of the CSE.

In each entry of the CSE, an IID (instruction identifier) for identifying each instruction and a valid flag for indicating validity or invalidity of the registered instruction are registered. The number of entries of the CSE is for example about several dozen entries. The processor is equipped with, other than the CSE, an instruction queue called RS (Reservation Station) in which each instruction can be registered with priority and can be executed out-of-order. An IID to identify each instruction is also registered in each entry of the RS. The memory copy instruction is processed in the operand address generator via the RS, and a memory copy process according to the memory copy instruction is performed. In this case, the instruction registered in the CSE in the order of decoding and the instruction executed out-of-order via the RS are linked by the IID. Then, the instruction for which execution is completed via the RS is compared with an entry in the CSE by the IID registered in the entry of the RS corresponding to the instruction, and the valid flag of the entry of the CSE in which the same IDD is registered is changed to a value indicating invalidity, to complete the execution of the instruction. The order of instructions executed out-of-order via the RS is ensured by the CSE according to the linked control.

In FIG. 1A, the data transfer capacity of a memory copy instruction is for example 16 bytes (16 B), and a "16 B memory copy" instruction indicates that it is a data transfer instruction up to 16 bytes.

On the other hand, if a data size that exceeds the data transfer capacity in one cycle between the main memory and the secondary cache, or between the secondary cache and the primary data cache is specified in one instruction as the copy size, a process illustrated in FIG. 1B is executed. In this case, the instruction decoder executes a process called multi-flow expansion for a "32 B memory copy" instruction that is a data transfer instruction for 32 bytes for example. In the multi-flow expansion, the "32 B memory copy" instruction is separated into two "16 B memory copy" instructions. Each of the "16 B memory copy" instructions decoded into a plurality of instructions in this way is registered in an individual CSE entry CSE0 and CSE1 as illustrated in FIG. 1B. Each of the "16 B entry copy" instructions registered respectively in the CSE0 and CSE1 is executed out-of-order via an individual RS entry linked via corresponding IID registered together with each of the instructions, and is subjected individually to a pipeline process in the operand address generator. As a result, 16-byte memory copy process is executed.

Here, when it is desired to perform copy of data exceeding the maximum size that can be specified by a memory copy instruction, the memory copy instructions are described successively in the program. That is, a memory copy process for a large size is described as a plurality of successive memory copy instructions. Furthermore, when the data size specified by each memory copy instruction exceeds the data transfer capacity in one cycle between the secondary cache and the primary data cache, each memory copy instruction is subjected to multi-flow expansion and executed. For example, it is assumed that the data transfer capacity between the secondary cache and the primary data cache is 16 bytes, and the maximum data size specified by one memory copy instruction is 256 bytes. In this case, a memory copy process for 1024 bytes for example is described as four successive 256-byte memory copy instructions, and each of the 256-byte memory copy instructions are subjected to multi-flow expansion into 16 16-byte memory copy instructions.

In this case, for each of the case in which the primary data cache was hit in the memory access according to each memory copy instruction, the case in which the primary data cache was missed and the secondary cache was hit in the memory access, and the case in which both were missed in the memory access, there are significant differences in data access time, as illustrated in FIG. 2. In FIG. 2, "L1$HIT" indicates the case in which the primary data cache is hit. In addition, "L1$miss, L2$HIT" indicates the case in which the primary data cache is missed and the secondary cache is hit. Furthermore, "L1$, L2$miss" indicates the case in which both the primary data cache and the secondary cache are missed. Of course, at the time of execution of memory access, a high-speed processing can be performed when the frequency of occurrence of "L1$miss, L2$HIT" is higher than "L1$, L2$miss" and "L1$HIT" than "L1$miss, L2$HIT".

Therefore, when successive memory copy instructions are described and a memory copy instruction of the maximum size (256 bytes for example) that can be specified with one instruction is specified as each of the memory copy instructions, control as described below is performed. Meanwhile, in the following description, the memory copy instruction obtained by performing multi-flow expansion for each memory copy instruction is referred to as an MF memory copy instruction.

For the execution of the first MF memory copy instruction obtained by performing multi-flow expansion for each memory copy instruction, a prefetch request is issued. The prefetch instruction is not issued at the time of execution of the second and subsequent MF memory copy instructions obtained by performing multi-flow instruction for each memory copy instruction.

As a result, upon execution of the first MF memory copy instruction obtained by performing multi-flow expansion for each memory copy instruction, if both the primary data cache and the secondary cache are missed (L1$, L2$miss), a fetch operation and a prefetch operation as described below are performed.

That is, first, memory data of an address range of several blocks from the memory address specified by the first MF memory copy instruction are fetched from the main memory to the secondary cache, and a part of the memory data is further fetched also to the primary data cache. The address range of several blocks is an address range corresponding for example to one data transfer from the main memory to the secondary cache, for example 256 bytes.

Together with this operation, based on the miss of the primary data cache (L1$miss) at the time of execution of the first MF memory copy instruction, and based on the prefetch request issued with the instruction, a prefetch operation is performed. As a result, memory data of the an address range of the several blocks further from the several blocks beyond the memory address specified by the first MF memory copy instruction is prefetched to the secondary cache in advance.

When the primary data cache is hit (L1$HIT) for the first MF memory copy instruction, no prefetch operation is performed regardless of the prefetch request described above.

For the second and subsequent MF memory copy instructions other than the first MF memory copy instruction obtained by performing multi-flow expansion for each memory copy instruction, since no prefetch request is issued, the prefetch operation described above is not performed. When the primary data cache is missed (L1$miss) at the time of executing the second and subsequent MF memory copy instructions, the normal fetch operation for the secondary cache or the main memory is performed.

Here, the case in which after one memory copy instruction is subjected to multi-flow expansion and executed, the next memory copy instruction is executed successively is considered. In this case, the rate at which the memory data corresponding to each MF memory copy instruction above has been fetched to the secondary cache even if the primary data cache is missed (L1$miss) for each MF memory copy instruction corresponding to the next memory copy instruction, increases. That is, there is a high possibility that the secondary cache is hit (L2$HIT). Accordingly, control is performed so as to reduce penalty due to cache miss (L2$miss) for the second and subsequent memory copy instructions.

Meanwhile, when executing the first MF memory copy instruction corresponding to the next memory copy instruction described above, a prefetch request is issued again. As a result, when the primary data cache is missed (L1$miss) at the time of execution of the next memory copy, the prefetch operation is to be performed further for the following memory copy instruction. As a result, the memory data for the memory copy instruction following the memory copy instruction being executed by the current multi-flow expansion is to be prefetched sequentially to the secondary cache.

The first case in which a memory copy instruction of the maximum size is preformed based on the multi-flow expansion in the prefetch control process is described more specifically, based on the operation illustration in FIG. 3.

In the example of case 1 in FIG. 3, the memory block of one data transfer from the second cache to the primary data cache is 64 bytes (64 B), and the maximum data size that can be specified with one memory copy instruction is 256 bytes. In addition, one large-size memory copy process is performed with successive 256-byte memory copy instructions. Then, assuming that each of the address A, B is located at the block boundary of the memory block, the copy source start address is A and the copy destination start address is B in the first 256-byte memory copy instruction in the memory copy process.

In FIG. 3, first, a prefetch request is issued at the time of execution of the first MF memory copy instruction obtained by performing multi-flow expansion for the first (1st) memory copy instruction. In the first MF memory copy instruction, the copy source start address is A, and the copy destination start address is B. The prefetch instruction is not issued for the second and subsequent MF copy instructions obtained by performing multi-flow expansion for the first (1st) memory copy instruction.

As a result, if the primary data cache and the secondary cache are both missed (L1$miss, L2$miss) at the time of executing the first MF memory copy instruction corresponding to the first (1st) memory copy instruction, a fetch operation and a prefetch operation as described below is performed.

That is, first, copy source memory data of the address range of 4 memory blocks from the memory address A specified by the first MF memory copy instruction corresponding to the first (1st) memory copy instruction is fetched from the main memory to the secondary cache. The address range corresponds to 64 B×4 memory blocks=256 bytes, from A to A+255. Furthermore, a part of memory blocks in the memory data fetched to the secondary cache is also fetched to the primary data cache. In addition, the copy destination memory area of the address range (from B to B+255) corresponding to 4 memory blocks from the memory address B specified by the first MF memory copy instruction is reserved (fetched) in the secondary cache.

Next, based on miss of the primary data cache (L1$miss) at the time of executing the first MF memory copy instruction corresponding to the first (1st) memory copy instruction, and based on the prefetch request issued for the instruction, a prefetch operation is performed. That is, copy source memory data of the address range corresponding to further 4 memory blocks from the 4 memory blocks from the memory address specified by the first MF copy instruction described above is prefetched from the main memory to the secondary cache. The address range is from A+256 to A+511. The same applies for reserving the area (prefetch) in the secondary cache for the copy destination memory data (from B+256 to B+511).

For the second and subsequent MF memory copy instructions other than the first MF memory copy instruction obtained by performing multi-flow expansion for the first (1st) memory copy instruction, since no prefetch request is issued, the prefetch operation described above is not performed. When the primary data cache is missed (L1$miss) at the time of executing the second and subsequent MF memory copy instructions, the normal fetch operation is performed. In this case, at the time of executing the first MF memory copy instruction corresponding to the first (1st) memory copy instruction, a fetch operation for the address range corresponding to 4 memory blocks from the memory address A (or B) from the main memory to the secondary cache has been performed. For this reason, in the fetch operation in the case in which the primary data cache is missed (L1$miss) at the time of executing the second and subsequent MF memory copy instructions, the secondary cache is hit, realizing a high-speed memory access.

Here, the case in which after the first (1st) memory copy instruction is subjected to multi-flow expansion and executed, the second (2nd) memory copy instruction is executed successively is considered. In this case, even if the primary data cache is missed (L1$miss) for each MF memory copy instruction corresponding to the second (2nd) memory copy instruction, memory data corresponding to each MF memory copy instruction mentioned above has been prefetched in the secondary cache. That is to say, the secondary cache is hit. Accordingly, control so as to reduce penalty due to miss of the secondary cache (L2$miss) for the second (2nd) memory copy instruction is performed.

Here, at the time of execution of the first MF memory copy instruction corresponding to the second (2nd) memory copy instruction, a prefetch request is issued again, Therefore, if the primary data cache is missed (L1$miss) at the time of execution of the first MF memory copy instruction corresponding to the second (2nd) memory copy instruction, a prefetch operation for the third (3rd) memory copy instruction is performed based on the prefetch request. Accordingly, a prefetch operation from the main memory of the address range from A+512 to A+767 and from B+512 to B+767 to the secondary cache is to be performed.

As described above, with the miss of the primary data cache (L1$miss) at the time of execution of the first MF memory copy instruction corresponding to each memory copy instruction, the prefetch operation for the next memory copy instruction of the memory copy instruction being currently performed is performed sequentially.

Next, the second case in which a memory copy instructions of the maximum size are sequentially preformed, based on the multi-flow expansion, in the prefetch control process is described more specifically, based on the operation illustration in FIG. 4.

In the example of case 2 in FIG. 4, similar to the case 1 in FIG. 3, the memory block of one data transfer from the second cache to the primary data cache is 64 bytes (64 B), and the maximum data size that can be specified with one memory copy instruction is 256 bytes. In addition, similar to the case in FIG. 3, one large-size memory copy process is performed with successive 256-byte memory copy instructions. In the case in FIG. 4, assuming that the address A, B is located at the block boundary of the memory block, the copy source start address is A+16 and the copy destination start address is B+16 in the first 256-byte memory copy instruction in the memory copy process. That is, while in the case 1 in FIG. 2, the start address of the memory copy process is located on the block boundary (address A, B), in the case 2 in FIG. 4, the start address is not located on the block boundary.

In case 2 illustrated in FIG. 4, similar to the case 1 in FIG. 3, first, a prefetch request is issued at the time of execution of the first MF memory copy instruction obtained by performing multi-flow expansion for the first (1st) memory copy instruction. In the first MF memory copy instruction, the copy source start address is A+16, and the copy destination start address is B+16. The prefetch instruction is not issued for the second and subsequent MF copy instructions obtained by performing multi-flow expansion for the first (1st) memory copy instruction, similar to the case 1 in FIG. 3.

As a result, when the primary data cache and the secondary cache are both missed (L1$, L2$miss) at the time of executing the first MF memory copy instruction corresponding to the first (1st) memory copy instruction, a fetch operation and a prefetch operation as described below are performed.

That is, first, copy source memory data of the address range of 4 memory blocks from the memory address A+16 specified by the first MF memory copy instruction corresponding to the first (1st) memory copy instruction is fetched from the main memory to the secondary cache. The address range corresponds to 64 B×4 memory blocks=256 bytes, from A to A+255. Furthermore, a part of memory blocks in the memory data fetched to the secondary cache is also fetched to the primary data cache. The same applies to reservation (fetch) of the areas in the secondary cache for the copy destination memory data (from B to B+255).

Next, based on miss of the primary data cache (L1$miss) at the time of executing the first MF memory copy instruction corresponding to the first (1st) memory copy instruction, and based on the prefetch request issued for the instruction, a prefetch operation is performed. That is, copy source memory data of the address range corresponding to further 4 memory blocks from the 4 memory blocks from the memory address specified by the first MF copy instruction described above is prefetched from the main memory to the secondary cache. The address range is also specified in units of memory blocks, and is from A+256 to A+511. The same applies for the reservation of the area (prefetch) in the secondary cache for the copy destination memory data (from B+256 to B+511).

Here, the case in which after the first (1st) memory copy instruction is subjected to multi-flow expansion and executed, the second (2nd) memory copy instruction is executed successively is considered.

When executing the first MF memory copy instruction corresponding to the second (2nd) memory copy instruction, a prefetch request is issued again. Here, in the first MF memory copy instruction corresponding to the second (2nd) memory copy instruction, the copy source start address is A+272, and the copy destination start address is B+272. The memory block in which these addresses are included is the same one as the memory block that was accessed when the last MF memory copy instruction corresponding to the first (1st) memory copy instruction was executed. Therefore, in the case 2 in FIG. 4, at the time of executing the first MF memory copy instruction corresponding to the second (2nd) memory copy instruction, the primary data cache is hit (L1$HIT) without being missed. The prefetch operation from the main memory to the secondary cache is performed only when a prefetch request has been issued to the primary data cache and the primary data cache is missed (L1$miss). Therefore, at the time of execution of the first MF memory copy instruction corresponding to the second (2nd) memory copy instruction, although a prefetch request has been issued, a prefetch operation for the third (3rd) memory copy instruction is not to be performed.

As a result, when the primary data cache is missed (L1$miss) first at the time of performing multi-flow expansion for the third (3rd) memory copy instruction, no memory data for the third (3rd) memory copy instruction exists on the secondary cache. For this reason, the primary data cache and the secondary cache are both to be missed (L1$, L2$miss), there arises a need to fetch memory data for the third (3rd) memory copy instruction from the main memory to the secondary cache. After this, instruction execution of each MF memory copy instruction corresponding to the third (3rd) memory copy instruction is to be delayed until the fetch operation is completed, generating a large memory access penalty.

Furthermore, in the first MF memory copy instruction corresponding to the third (3rd) memory copy instruction, the copy source start address is A+528, and the copy destination start address is B+528. The memory block in which these addresses are included is the same one as the memory block that was accessed when the last MF memory copy instruction corresponding to the second (2nd) memory copy instruction was executed. Therefore, in the case 2 in FIG. 4, at the time of executing the first MF memory copy instruction corresponding to the second (3nd) memory copy instruction, the primary data cache is also hit (L1$HIT) without being missed. For this reason, also at the time of execution of the first MF memory copy instruction corresponding to the third (3rd) memory copy instruction, although a prefetch request has been issued, a prefetch operation for the fourth (4th) memory copy instruction is not to be performed.

By such a negative spiral, in the case 2 in FIG. 4, for all of the second (2nd) and subsequent memory copy instructions, no prefetch operation is to be performed even though a prefetch request is issued in the first MF memory copy instruction corresponding to each memory copy instruction. As a result, there has been a problem that the memory access efficiency of the memory copy instruction significantly decreases.

Related art is described, for example, in Japanese Laid-open Patent Publication No. 59-218691 and Japanese Laid-open Patent Publication No. 58-169384.

SUMMARY

According to an aspect of an invention, a prefetch request circuit is provided in a processor device, the processor device having hierarchized two or more storage areas, the processor device being able to prefetch data of address to be used between appropriate storage areas among the two or more storage areas, when executing respective instruction flows obtained by multi-flow expansion for one instruction at a time of decoding of the instruction. The prefetch request circuit includes: a latch unit to hold, when a state in which the respective instruction flows to access the storage area are executed with a maximum specifiable data transfer volume is specified, the state during a time period of the multi-flow expansion; and a prefetch request signal output unit to output a prefetch request signal to request the prefetch every time when the instruction flow is executed, based on an output signal of the latch unit and a signal indicating an execution timing of the respective instruction flows.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an overall configuration diagram of a processor device to which the embodiment may be applied.

DESCRIPTION OF EMBODIMENTS

Figure 1A:
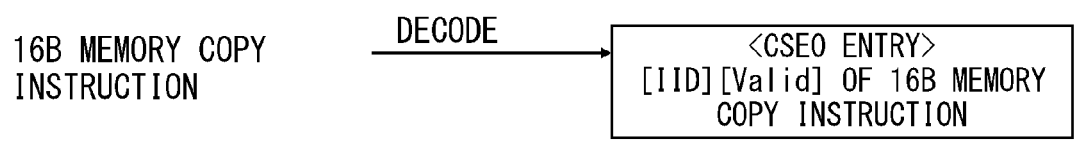
FIG. 1A and FIG. 1B are explanatory diagrams of multi-flow expansion.
Figure 1B:
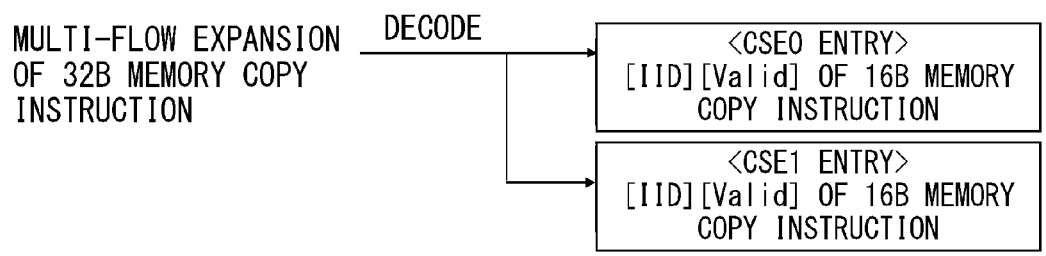
Figure 2:
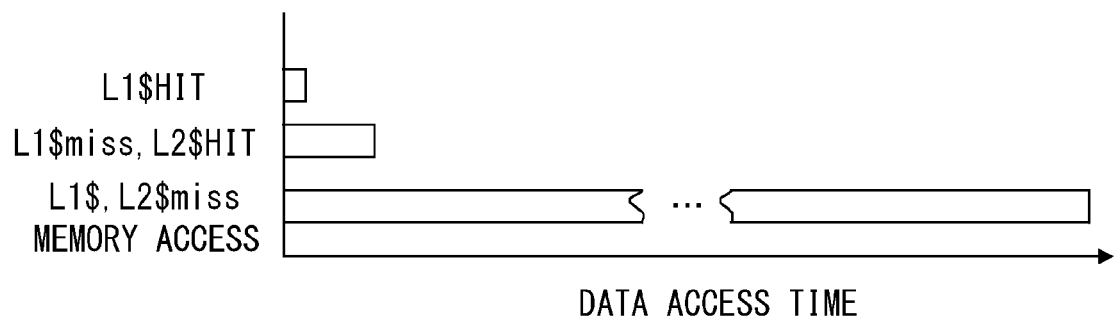
FIG. 2 is an explanatory diagram of penalty at the time of cache miss.

Hereinafter, embodiments of the present invention are described in detail with reference to the drawings.

FIG. 5 is an overall configuration diagram of a processor device according to an embodiment of the present invention. In the processor device illustrated in FIG. 5, with an instruction fetch address generator 519 accessing a primary instruction cache 503, a necessary instruction is read out from a main memory 501 via a secondary cache 502 and the primary instruction cache 503. The read out instruction is sent to an instruction decoder 504.

The instruction decoder 504 decodes an instruction in order in a decode (D) cycle.

Instructions decoded by the instruction decoder 504 are registered in order in a CSE (commit Stack Entry) 505. At the same time, instructions decoded by the instruction decoder 504 are registered in an RSA (Reservation Station for Address) 506 and an RSE (Reservation Station for Execute) 507 to perform out-of-order execution control. Furthermore, if the instruction decoded by the instruction decoder 504 is a branch instruction, the instruction is registered in an RSBR (Reservation Station for Branch) 508. In each entry of the CSE 505, RSA 506, RSE 507 and RSBR 508, an IID (instruction identifier) for identifying each instruction decoded by the instruction decoder 504 is registered. In addition, in each entry of the CSE, a valid flag for specifying whether the registered instruction is valid or invalid is registered together with the IID. The instructions registered in the CSE 505 in the order of decoding and the instructions executed out of order via the RSA 506, the RSE 507 or the RSBR 508 are linked by the instruction identifier (IID). The instruction for which execution is completed via the RSA 506, the RSE 507 or the RSBR 508 is compared with the entry in the CSE 505 using the IID registered in the entry of the RSA 506, the RSE 507 or the RSBR 508 corresponding to the instruction. Then, the valid flag of the entry in the CSE 505 in which the same IID is registered is changed to a value indicating invalidity and the execution of the instruction is completed. According to this link control, the order of instructions executed out of order via the RSA 506, the RSE 507 or the RSBR 508 are ensured by the CSE 505.

In a case in which the instruction decoder 504 decodes and issues a plurality of instructions at the same time, such as when multi-flow expansion is performed for a memory copy instruction, each instruction issued by the instruction decoder 504 is registered in the RSA 506. Alternatively, also in a case such as when a cache miss occurs in the primary data cache 510 and it takes long time to fetch memory data, a subsequent instruction issued by the instruction decoder 504 is registered in the RSA 506.

In the RSA 506, the priority of each entry is determined. For the memory access instruction registered in the RSA 506 for which execution has become possible in the priority (P) cycle, an operand address generator 509 calculates the memory address to access in the address calculation (X) cycle. As the memory access instruction, there are a load instruction, store instruction, memory copy instruction, and the like. The operand address generator 509 accesses the primary data cache 510 with the calculated address.

When there is no entry in the RSA 506, the instruction is not registered in the RSA 506 and fed to the operand address generator 509 immediately after being decoded by the instruction decoder 504.

From the RSA 506 to the primary data cache, a prefetch request signal +P_PREFETCH_REQUEST is issued. In the prior art, the prefetch request signal is issued only at a timing at which the first MF memory copy instruction among MF memory copy instructions (multi-flow expansion instruction) corresponding to the memory copy instruction having the maximum copy size is issued, as described in FIG. 3 or FIG. 4 etc. In this embodiment, as described later, every time the MF memory copy instruction obtained by multi-flow expansion from the memory copy instruction having the maximum copy size is issued from the RSA 506, the prefetch request signal +P_PREFETCH_REQUEST is issued.

For an arithmetic operation instruction or a logic operation instruction, the contents of a fixed decimal point register 513 or a floating decimal point register 514 is read, and fed to an operator 511 or 512 out of order. The operator 511 or 512 executes an operation specified by the operation instruction in an operation execution (x) cycle.

The execution result in the operator 511 or 512 is stored in the fixed decimal point update buffer 515 or the floating decimal point update buffer 516 in the register update (U) cycle, and waits for the instruction completion (commit) process. After the CSE 505 receives a report of the operation execution completion in the operator 511 or 512, the data transfer completion in the primary data cache 510, or the branch judgment completion from a branch prediction mechanism 518 and the like, the commit process is performed in order in the fixed decimal point update buffer 515 or the floating decimal point update buffer 516. Furthermore, in the register write (W) cycle, writing into register 513 or 514 from the fixed decimal point update buffer 515 or the floating decimal point update buffer 516 is performed.

When the execution of one instruction registered in the CSE 505 is completed, the registration in the CSE 505 is deleted with the valid flag of the entry in the CSE 505 corresponding to the instruction for which execution is completed being changed to a value indicating invalidity. Then, the contents of a PSW (Program Status Word) 517 specifying the next instruction fetch address is updated.

The instruction fetch address generator 519 generates the next instruction fetch address based on instruction fetch address information given from the PSW 517, RSBR 508, or RSBR 508 via the branch prediction mechanism 518, and accesses the primary instruction cache 503 with the generated instruction fetch address.

In the processor having the configuration described above, at the time of execution of an instruction to access the memory, if the access to the primary data cache 510 is missed, a memory block including the address to be accessed is fetched from the secondary cache 502 or the main memory 501. By so doing, data is provided to the primary data cache 510. An instruction such as the memory copy instruction that cannot be processed in one pipeline is subjected to multi-flow expansion in the operation decoder 504. Then, for every expanded flow, registration of instruction in the CSE 505, RSA 506, RSE 507 and RSBR 508 is performed, and one instruction is executed by superscalar and pipeline process.

Figure 6:
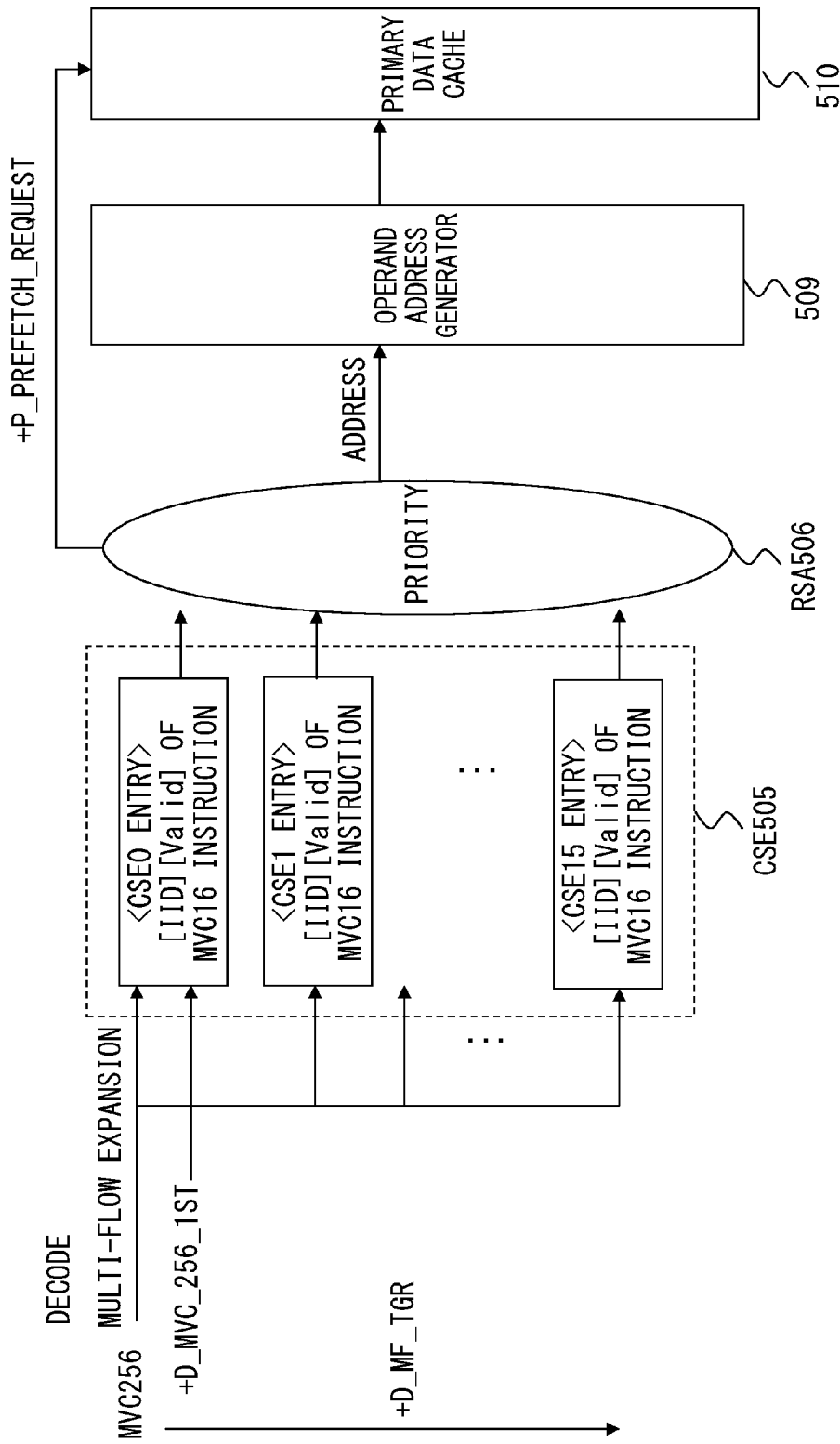
FIG. 6 is an explanatory diagram of a memory access operation by the instruction decoder, CSE, RSA, operand address generator, and primary data cache in FIG. 5.

FIG. 6 is an explanatory diagram of a memory access operation by the instruction decoder 504, CSE 505, RSA 506, operand address generator 509, and primary data cache 510. An MVC (MOVE character) instruction is assumed as an example of a memory copy instruction. The MVC instruction is a memory copy instruction to specify data of maximum 256 bytes in units of bytes and copy the data from any copy source address A to a copy destination address B. In this example, an MVC instruction of the maximum value 256 bytes is called an "MVC 256" instruction.

In the instruction decoder 504, an MVC 256 instruction decoded in a decode (D) cycle is separated into 16 "MVC 16" instructions by multi-flow expansion. The "MVC 16" instruction is an instruction to perform data LOAD or STORE, or simultaneous processing of LOAD and STORE for the main memory 501, the secondary cache 502, or the primary data cache 510 in units of 16 bytes.

Each of the "MVC 16" instructions subjected to the multi-flow expansion and decoded into a plurality of MF memory copy instructions is registered individually in the CSE entries CSE0-CSE15 of the CSE 505, as illustrated in FIG. 6. In addition, each of the "MVC 16" instructions is registered in the RSA 506 and RSE 507. At this time, as described above, the IID of each of the "MVC 16" instructions is registered in each of the CSE entries CSE0-CSE15, and each of the CSE entries CSE0-CSE15 and each entry in the RSA 506 of the RSE 507 are linked.

In the entry in the RSA 506 in which the first "MVC 16" instruction among the "MVC 16" instructions obtained by multi-flow expansion from the "MVC 256" instruction is registered, together with the IID corresponding to the first "MVC 16" instruction, +D_MVC_256_1ST signal is set. The +D_MVC_256_1ST signal, set from the instruction decoder 504, indicates the first MF memory copy instruction with multi-flow expansion for a memory copy instruction whose copy size is the maximum of 256 bytes.

In addition, from the decode (D) cycle of the first "MVC 16" instruction until when the last "MVC 16" instruction is fed into the operator 511 or 512 among the "MVC 16" instructions obtained by multi-flow expansion of the "MVC 256" instruction (the time period of t2-t5 in FIG. 8 described later), the +D_MF_TGR signal of high level is output from the instruction decoder 504 to the RSA 506.

Each entry of each "MVC 16" instruction registered in the RSA 506 is issued to the operand address generator 509 in descending order of priority. As a result, the operand address generator 509 performs memory access to the primary data cache 510. Meanwhile, from the RSA 506 to the primary data cache, every time when each "MVC 16" instruction is issued, +P_EAG_VALID signal for enabling the operand address generator 509 (EAG) VALID is asserted.

In addition, from the RSA 506 to the primary data cache 510, every time multi-flow expansion instruction "MVC 16" corresponding to the "MVC 256" instruction is issued from the RSA 506, a prefetch request signal +P_PREFETCH_REQUEST is asserted.

Figure 7:
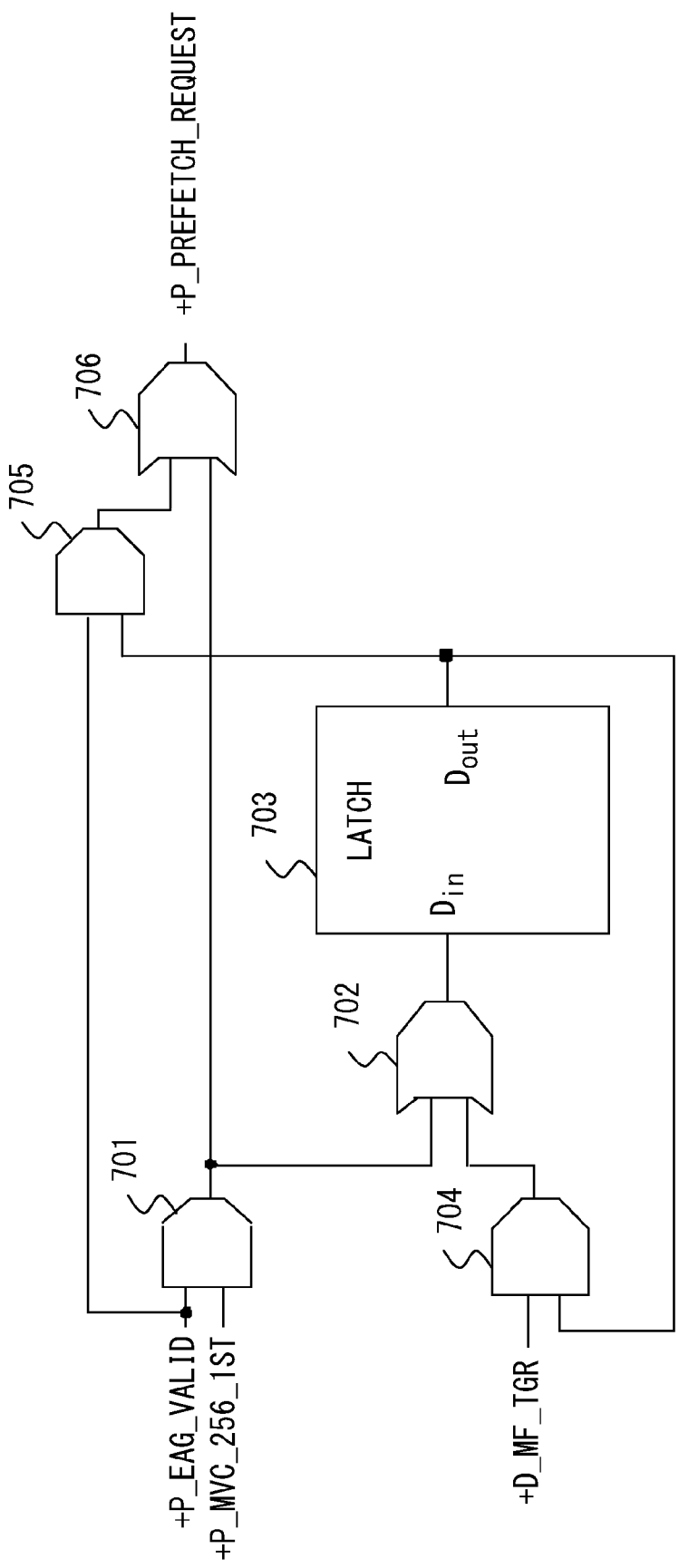
FIG. 7 is a diagram illustrating an embodiment of a prefetch request circuit.
Figure 8:
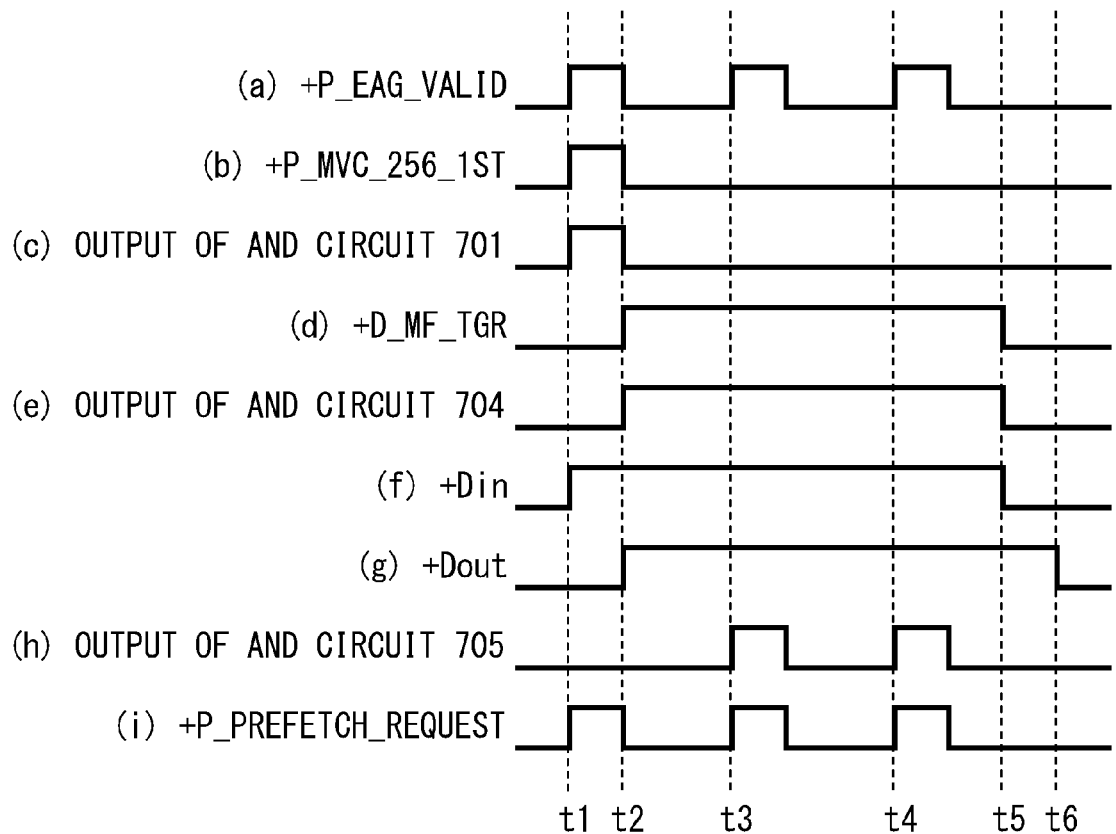
FIG. 8 is an operation timing chart of an embodiment of the prefetch request circuit.

FIG. 7 is a diagram illustrating the configuration of a prefetch request circuit implemented in the RSA 506 to issue the prefetch request signal +P_PREFETCH_REQUEST mentioned above. FIG. 8 is an operation timing chart illustrating the operation of the prefetch request circuit in FIG. 7.

Figure 3:
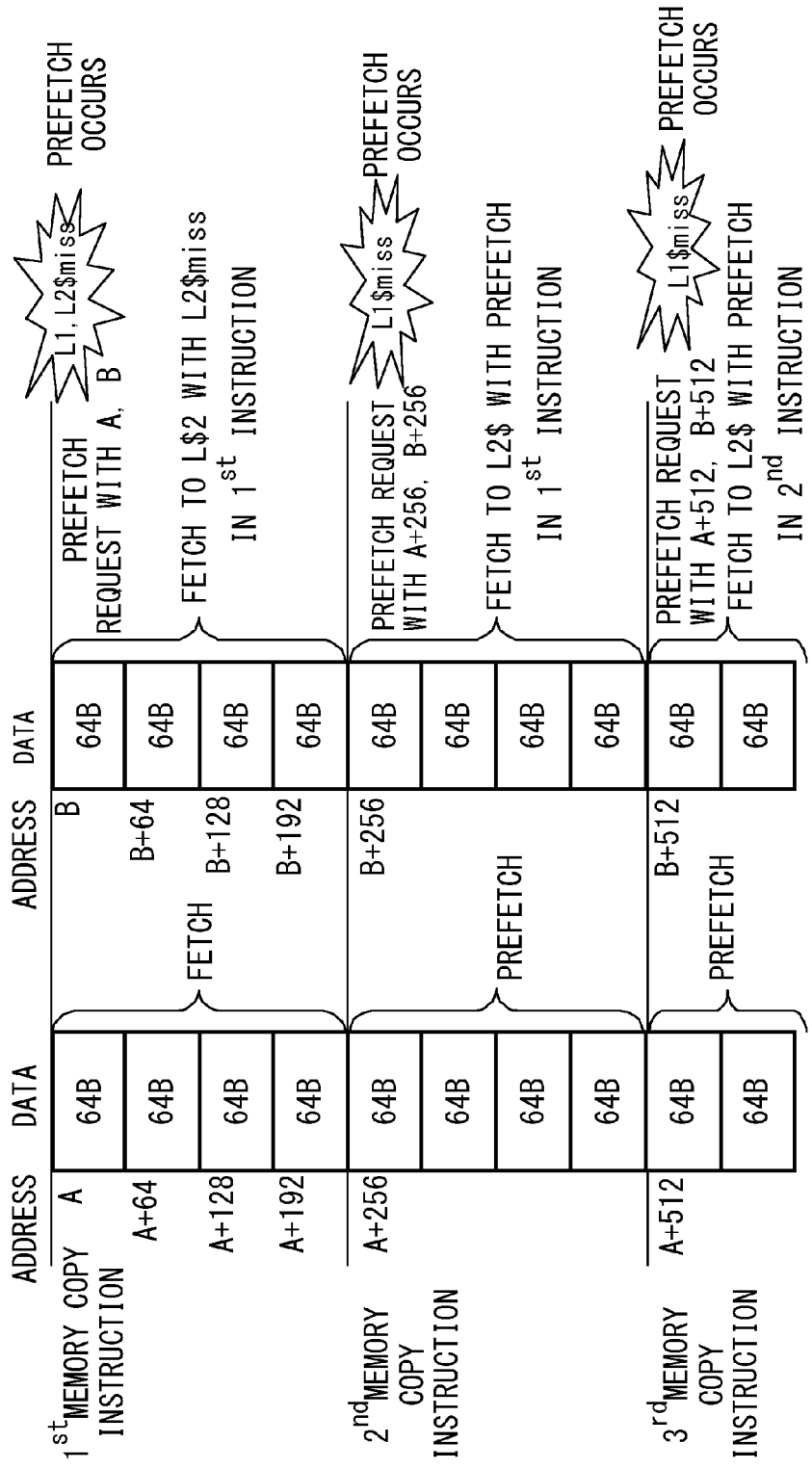
FIG. 3 is a diagram for explaining the effect of prefetch.
Figure 4:
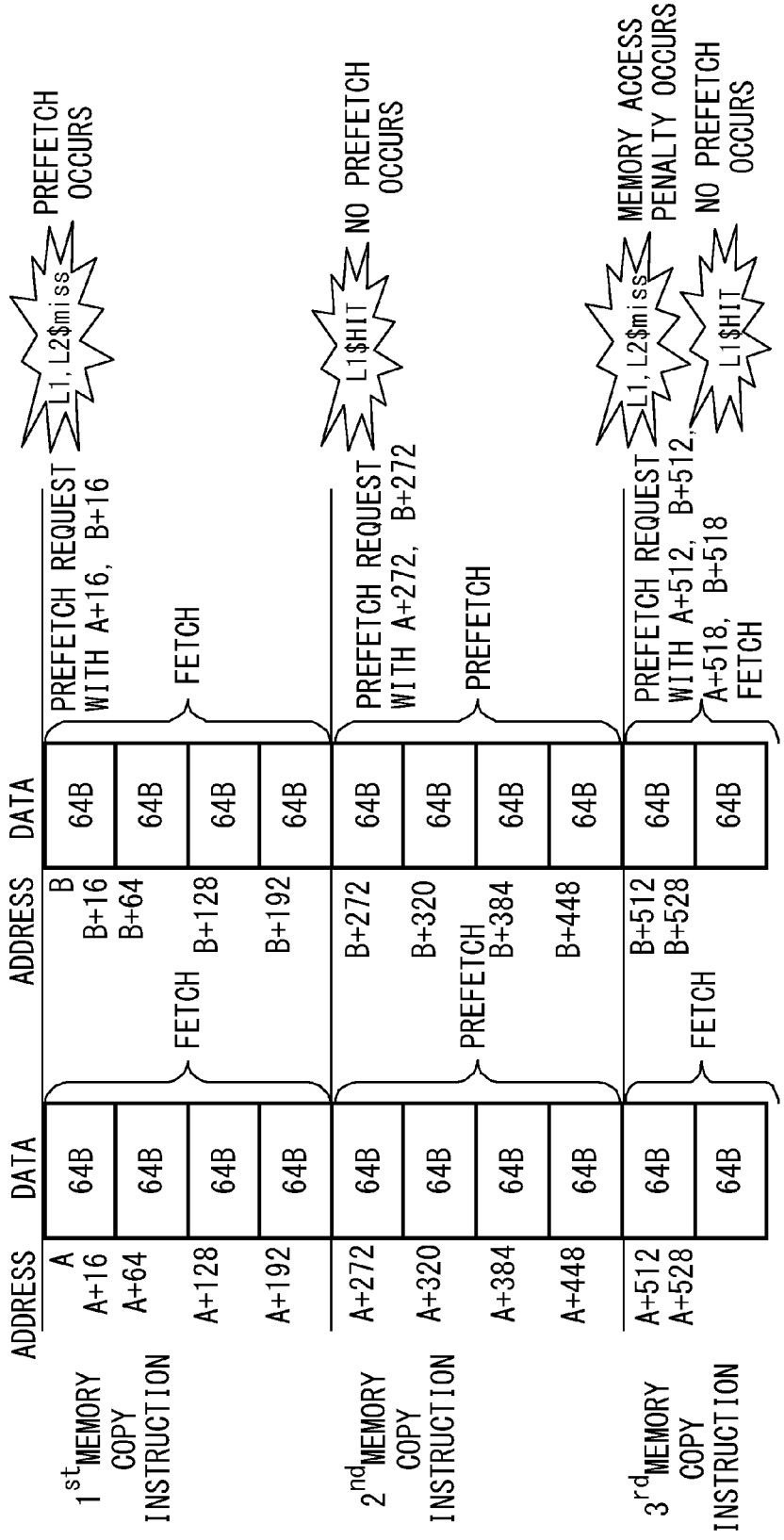
FIG. 4 is an explanatory diagram of a problem with conventional arts.

In the conventional art, as illustrated in FIG. 3, FIG. 4 and the like, in each multi-flow expansion instruction "MVC 16" corresponding to the "MVC 256" having the maximum copy size, a prefetch request signal is issued only when the first "MVC 16" instruction is issued. By contrast, in this embodiment, the prefetch request signal +P_PREFETCH_REQUEST is issued every time when the "MVC 16" instruction is issued as illustrated as FIG. 8(*i*).

In order to output the prefetch request signal +P_PREFETCH_REQUEST, the prefetch request circuit in FIG. 7 operates as described below.

First, the prefetch request circuit in FIG. 7 operates according to +D_MF_TGR signal, +P_EAG_VALID signal and +P_MVC_256_1ST signal.

The +D_MF_TGR signal is, as described above, issued by the instruction decoder 504 and is asserted in the time period during which multi-flow expansion is performed. For example, the +D_MF_TGR signal is asserted in the time period from t2 to t5 in FIG. 8(d).

The +P_EAG_VALID signal is, as described above, asserted by the RSA 506 every time when the RSA 506 issues an instruction to the operand address generator 509. For example, the +P_EAG_VALID signal is asserted at each timing of t1, t3, t4 in FIG. 8(a).

The +P_MVC_256_1ST signal is generated within the RSA 506 based on the +D_MVC_256_1ST signal issued by the instruction decoder 504. More specifically, the +P_MVC_256_1ST signal is issued at the timing when the first "MVC 16" instruction obtained by multi-flow expansion from the "MVC 256" instruction having the maximum copy size is issued from the RSA 506 to the operand address generator 509. At the timing when the first "MVC 16" instruction is executed, the +P_MVC_256_1ST signal is asserted based on the +D_MVC_256_1ST signal set in the entry in the RSA 506 in which the first "MVC 16" instruction is registered. The +P_MVC_256_1ST signal is asserted at the timing t1 in FIG. 8(b) for example.

In FIG. 7, an AND circuit 701 calculates AND operation between the +P_MVC_256_1ST signal (FIG. 8(b)) and the +P_EAG_VALID signal (FIG. 8(a)), and outputs a signal that is asserted in the time period from t1 to t2 in FIG. 8(c) for example.

The output of the AND circuit 702 asserted in the time period from t1 to t2 is issued to the primary data cache 510 via an OR circuit 706 as a prefetch request signal +P_PREFETCH_REQUEST corresponding to the first multi-flow expansion instruction "MVC16" for the "MVC 256" instruction.

The output of the AND circuit 701 asserted in the time period from t1 to t2 is, at the same time, input to an input terminal Din of a 1-bit latch 703 via an OR circuit 702, and latched by the 1-bit latch 703. FIG. 8(d) illustrates the output signal of the OR circuit 702 input to Din, which is asserted in the time period from t1 to t5.

The signal latched by the 1-bit latch 703 is output from Dout of the 1-bit latch 703 in the next clock cycle. The Dout output signal is ANDed in an AND circuit 704 with a +D_MF_TGR signal (FIG. 8 (d)) input by the instruction decoder 504. As a result, the output of the AND circuit 704 is asserted in the time period from t2 to t5 in FIG. 8(e) for example.

The output signal of the AND circuit 704 is provided to the input terminal Din of the 1-bit latch 703. Thus, during the multi-flow expansion period, the output terminal Dout of the 1-bit latch 703 is in the assert state. FIG. 8(g) illustrates the output signal from the output terminal Dout of the 1-bit latch 703, which is maintained in ON in the time period from t2 to t6.

An AND circuit 705 ANDs +P_EAG_VALID and the output signal Dout (FIG. 8(g)) of the 1-bit latch 703. The +P_EAG_VALID signal is asserted, as illustrated in FIG. 8(a), every time when the RSA 506 issues an instruction to the operand address generator 509. In addition, the output signal Dout of the 1-bit latch 703 is, as illustrated in FIG. 8(g), asserted during the multi-flow expansion period of the "MVC 256" having the maximum copy size.

Therefore, the output signal of the AND circuit 705 is, as illustrated in FIG. 8(h), asserted at each timing t3 and t4 corresponding to the second and subsequent multi-flow expansion instructions "MVC16" corresponding to the "MVC 256" instruction having the maximum copy size. This output signal is issued to the primary data cache 510 as the prefetch request signal +P_PREFETCH_REQUEST via the OR circuit 706.

As a result, by the OR operation output of the AND circuits 701 and the AND circuit 705, a prefetch request signal +P_PREFETCH_REQUEST is issued to the primary data cache 510 at every timing of execution of each "MVC 16" instruction corresponding to the "MVC 256" instruction.

Figure 9:
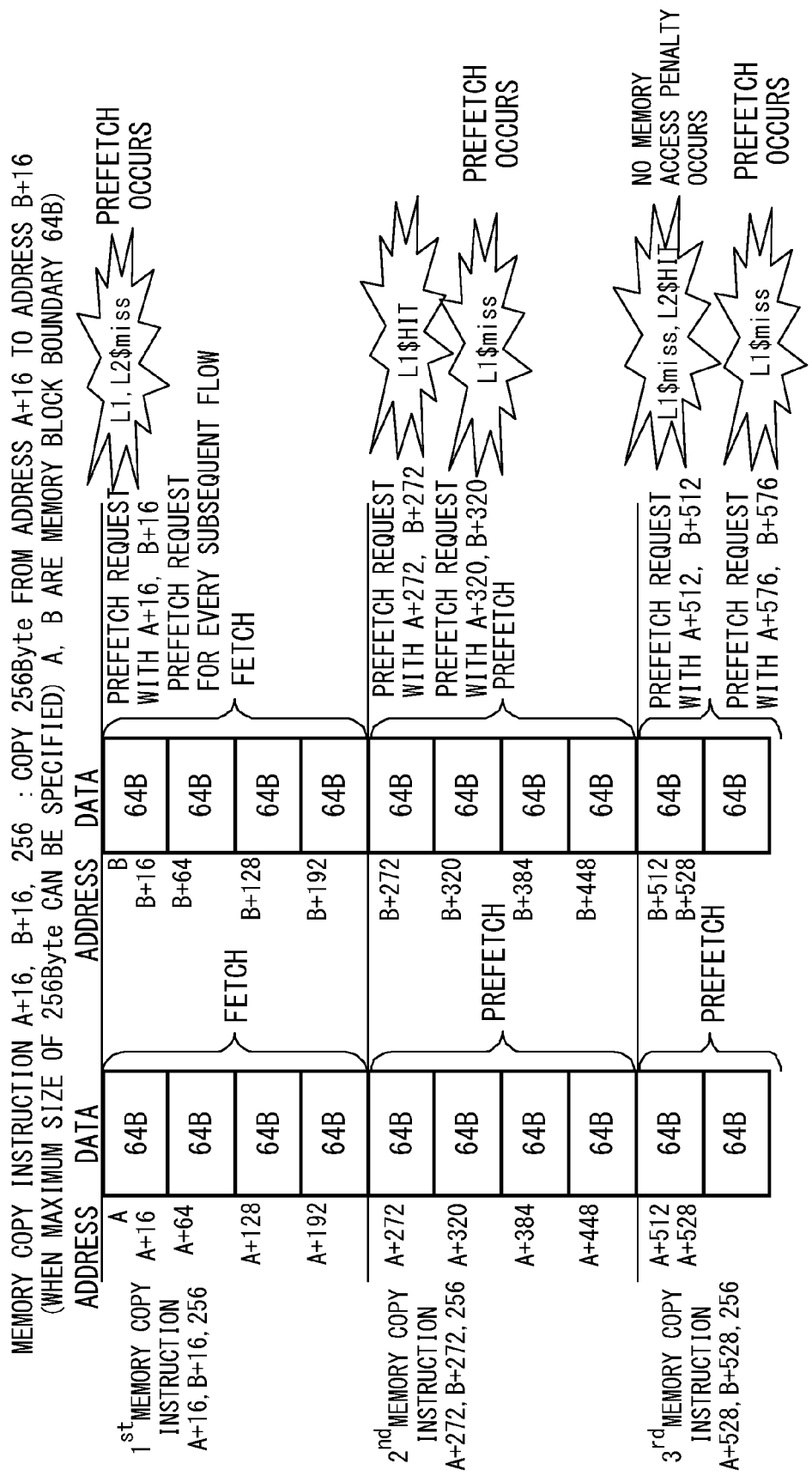
FIG. 9 is a diagram explaining the effect of the embodiment.

FIG. 9 is a diagram for explaining the effect of the prefetch request circuit in FIG. 7.

In the case in FIG. 9, similar to the case 2 in FIG. 4 described above, the memory block of one data transfer from the second cache to the primary data cache is 64 bytes (64 B), and the maximum data size that can be specified with one memory copy instruction is 256 bytes. In addition, similar to the case 2 in FIG. 4, one large-size memory copy process is performed with successive 256-byte memory copy instructions. Furthermore, similar to the case 2 in FIG. 4, assuming that the address A, B is located at the block boundary of the memory block, the copy source start address is A+16 and the copy destination start address is B+16 in the first 256-byte memory copy instruction in the memory copy process. That is, the start address of the memory copy process does not exist on the block boundary.

In the case in FIG. 9, first, a prefetch request signal +P_PREFETCH_REQUEST is issued by the prefetch request circuit in FIG. 7 at the time of execution of the first MF memory copy instruction obtained by performing multi-flow expansion for the first (1st) memory copy instruction. This timing corresponds for example to the time period from t1 to t2 in FIG. 8(i). In the first MF memory copy instruction, the copy source start address is A+16, and the copy destination start address is B+16.

Based on the address described above specified by the first MF memory copy instruction, the operand address generator 509 calculates the access address, and accesses the primary data cache 510. As a result, if the primary data cache 510 and the secondary cache 502 are both missed (L1$, L2$miss) at the time of executing the first MF memory copy instruction corresponding to the first (1st) memory copy instruction, a fetch operation and a prefetch operation as described below are performed.

That is, first, copy source memory data of the address range of 4 memory blocks starting from the memory address A+16 specified by the first MF memory copy instruction corresponding to the first (1st) memory copy instruction is fetched from the main memory 501 to the secondary cache 502. The address range is specified in units of memory blocks, and corresponds to 64 B×4 memory blocks=256 bytes, that is, from A to A+255. Furthermore, a part of memory blocks in the memory data fetched to the secondary cache 502 is also fetched to the primary data cache 510. The similar process is applied to the reservation (fetch) of the areas in the secondary cache for the copy destination memory data (from B to B+255).

Then, based on the prefetch request signal +P_PREFETCH_REQUEST issued for the first MF memory copy instruction corresponding to the first (1st) memory copy instruction, a prefetch operation is performed. That is, copy source memory data of the address range of 4 memory blocks starting from an address forwarded 4 memory blocks from the memory address specified by the first MF memory copy instruction described above is prefetched from the main memory 501 to the secondary cache 502. The address range is also specified in units of memory blocks, and is from A+256 to A+511. The similar process is applied to the reservation of the area (prefetch) in the secondary cache for the copy destination memory data (from B+256 to B+511).

Next, in the present embodiment, for the second and subsequent MF memory copy instructions other than the first MF memory copy instruction obtained by performing multi-flow expansion for the first (1st) memory copy instruction, the prefetch request signal +P_PREFETCH_REQUEST is issued. For example, the +P_PREFETCH_REQUEST is issued at the timing t3 and timing t4 in FIG. 8(i). Here, if the primary data cache is missed (L1$miss), a prefetch operation is performed based on the prefetch request signal +P_PREFETCH_REQUEST issued for the MF memory copy instruction currently being executed. That is, the portion that does not exist in the secondary cache 502 in the address range of 4 memory blocks starting from an address forwarded 4 memory blocks from the memory address specified by the MF memory copy instruction currently being performed is prefetched from the main memory 501 to the secondary cache 502.

Here, the case in which after the first (1st) memory copy instruction is subjected to multi-flow expansion and executed, the second (2nd) memory copy instruction is successively executed is considered.

When executing the first MF memory copy instruction corresponding to the second (2nd) memory copy instruction, a prefetch request is issued again. Here, in the first MF memory copy instruction corresponding to the second (2nd) memory copy instruction, the copy source start address is A+272, and the copy destination start address is B+272. The memory block in which these addresses are included is the same one as the memory block that was accessed when the last MF memory copy instruction corresponding to the first (1st) memory copy instruction was executed. Therefore, in the case in FIG. 9, at the time of executing the first MF memory copy instruction corresponding to the second (2nd) memory copy instruction, the primary data cache is hit (L1$HIT) without being missed. Therefore, at the time of execution of the first MF memory copy instruction corresponding to the second (2nd) memory copy instruction, a prefetch request is issued, but no prefetch operation is performed.

Next, the timing at which the MF memory copy instruction specifying the address of the memory block boundary A+320 (B+320) among the MF memory copy instructions corresponding to the second (2nd) memory copy instruction. In this case also, a prefetch request signal +P_PREFETCH_REQUEST is issued by the prefetch request circuit in FIG. 7. In this case, since the memory block of the address area A+320 (B+320) has not been executed yet, corresponding data does not exist in the primary data cache 510. For this reason, the primary data cache 510 is missed (L1$miss). Accordingly, first, a memory block starting from the address A+320 (B+320) is fetched from the secondary cache 502 to the primary data cache 510. Together with this, based on L1$miss and the prefetch request signal +P_PREFETCH_REQUEST, a prefetch operation is performed. That is, copy source memory data of the address range of 4 memory blocks starting from an address forwarded 4 memory blocks from the address of the memory block boundary A+320 specified by the MF memory copy instruction is prefetched from the main memory 501 to the secondary cache 502. The address range is from A+576 to A+831. The similar process is applied to the reservation (prefetch) of the area in the secondary cache for the copy destination memory data (from B+576 to B+831).

As described above, the prefetch operation for the memory copy instruction for the third (3rd) memory copy instruction is to be performed appropriately.

Also at the time of performing multi-flow expansion of the third (3rd) memory copy instruction, similar to the case for the second (2nd) memory copy instruction described above, the prefetch operation is performed appropriately based on the prefetch request signal +P_PREFETCH_REQUEST issued for each MF memory copy instruction.

As described above, according to the prefetch request circuit illustrated in FIG. 7, it becomes possible to reduce penalty due to miss of the secondary cache for memory copy instructions executed successively with the maximum copy size even when the address specification of the multi-flow expansion instruction is not on the memory block boundary, to make the effect of the prefetch request high.

According to the embodemenys, it becomes possible to output a prefetch request signal with which the effect of a prefetch is high in any situation when memory access instructions of the maximum transfer capacity size are executed successively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A prefetch request circuit provided in a processor device, the processor device having hierarchized two or more storage areas, the processor device being able to prefetch data of address to be used between appropriate storage areas among the two or more storage areas, when executing respective instruction flows obtained by multi-flow expansion for one instruction at a time of decoding of the instruction, the prefetch request circuit comprising:
   a latch unit to hold, when a state in which the respective instruction flows to access the storage area are executed with a maximum specifiable data transfer volume is specified, the state during a time period of the multi-flow expansion; and
   a prefetch request signal output unit to output a prefetch request signal to request the prefetch every time when the instruction flow is executed, based on an output signal of the latch unit and a signal indicating an execution timing of the respective instruction flows.

2. The prefetch request circuit according to claim 1, wherein
   the prefetch request circuit is provided in a reservation station executing the instruction flow.

3. A prefetch request circuit in a processor apparatus having a main memory, a secondary cache and a primary data cache, performing multi-flow expansion for one instruction to obtain a plurality of instruction flows at a time of decoding the instruction, executing the respective instruction flows, and being able to prefetch data of address to be used from the main memory to the secondary cache at a time of memory access to the primary data cache, the prefetch request circuit comprising:
   a latch circuit unit to hold, when a state in which the respective instruction flows corresponding to a memory copy instruction specifying data copy or move between memory addresses and operation are executed with a maximum specifiable data transfer volume is specified, the state during a time period of the multi-flow expansion; and an AND circuit unit to perform AND operation between an output signal of the latch unit and a signal indicating an execution timing of the respective instruction flows and to output the AND operation result as a prefetch request signal every time when the respective instruction flows are issued.

4. The prefetch request circuit according to claim 3, wherein the prefetch request circuit is provided in a reservation station executing the instruction flow.

* * * * *